United States Patent [19]

Young et al.

[11] 4,455,286

[45] Jun. 19, 1984

[54] HIGH-TEMPERATURE SORBENT METHOD FOR REMOVAL OF SULFUR CONTAINING GASES FROM GASEOUS MIXTURES

[75] Inventors: John E. Young, Woodridge, Ill.; Vinod M. Jalan, Concord, Mass.

[73] Assignee: The United States of America as represented by the United States Department of Energy, Washington, D.C.

[21] Appl. No.: 395,895

[22] Filed: Jul. 7, 1982

[51] Int. Cl.$^3$ .................. C01B 17/16; C01B 31/20; C01B 17/00

[52] U.S. Cl. .................. 423/230; 423/244; 252/190; 55/73; 55/74

[58] Field of Search .......... 423/242 A, 242 R, 244 A, 423/244 R, 230; 252/190; 55/73, 74; 436/120, 121

[56] References Cited

U.S. PATENT DOCUMENTS

| | | | |
|---|---|---|---|
| 2,580,068 | 12/1951 | Beckley et al. | 423/244 |
| 3,778,501 | 12/1973 | Lang et al. | 423/244 |
| 3,974,256 | 8/1976 | Wheelock et al. | 423/230 |
| 4,002,720 | 1/1977 | Wheelock et al. | 423/230 |

FOREIGN PATENT DOCUMENTS

| | | | |
|---|---|---|---|
| 1522389 | 8/1978 | United Kingdom | 423/244 |
| 801858 | 3/1979 | U.S.S.R. | 423/244 |

OTHER PUBLICATIONS

U.S. DOE Solicitation No. DE-RP21-82MC19077, p. 6, 1982.

*Primary Examiner*—Gregory A. Heller
*Attorney, Agent, or Firm*—Robert J. Fisher; Hugh W. Glenn

[57] ABSTRACT

A copper oxide-zinc oxide mixture is used as a sorbent for removing hydrogen sulfide and other sulfur containing gases at high temperatures from a gaseous fuel mixture. This high-temperature sorbent is especially useful for preparing fuel gases for high temperature fuel cells. The copper oxide is initially reduced in a preconditioning step to elemental copper and is present in a highly dispersed state throughout the zinc oxide which serves as a support as well as adding to the sulfur sorption capacity. The spent sorbent is regenerated by high-temperature treatment with an air fuel, air steam mixture followed by hydrogen reduction to remove and recover the sulfur.

3 Claims, No Drawings

HIGH-TEMPERATURE SORBENT METHOD FOR REMOVAL OF SULFUR CONTAINING GASES FROM GASEOUS MIXTURES

CONTRACTUAL ORIGIN OF THE INVENTION

The U.S. Government has rights in this invention pursuant to Prime Contract No. W-31-109-ENG-38 between the U.S. Department of Energy and Argonne National Laboratory and Subcontract No. W-31-109-38-6298 with Giner, Inc.

BACKGROUND OF THE INVENTION

The present invention relates to a high-temperature method of removing sulfur containing gases from gaseous fuel mixtures particularly those provided for high-temperature fuel cell use. The invention particularly relates to the use of highly dispersed copper on zinc oxide to remove hydrogen sulfide from fuel gas at elevated temperatures. Previous methods for removing sulfur containing gases from fuel gases have included such low temperature techniques as scrubbing with liquid solutions containing alkaline minerals, or organic bases or alcohols. Such processes may be operated at low temperatures of 100°–150° C. or even at subambient temperatures. Therefore, these method are of considerable disadvantage for use in combination with high-temperature fuel cells such as molten carbonate or solid oxide fuel cells that operate at several hundred to over a thousand degrees Celsius.

Prior high-temperature bulk sorbents involving various oxides such as the lathanide oxides, oxides of iron and oxides of zinc have in some instances proven dissappointing in their performance and/or their regenerability. Iron oxides have been used typically as a first stage sorbent, removing $H_2S$ down to a level of about 200 ppm.

Therefore, it is an object of the present invention to provide a method of removing sulfur containing gases from high-temperature fuel gases using a sorbent with improved sulfur containing capacity.

It is a further object to provide a method involving the use of a highly dispersed sulfur sorbent material on a support also capable of sulfur removal from a fuel gas.

It is a further object to provide a regenerable solid sorbent material capable of removing hydrogen sulfide gas from a fuel gas mixture at temperatures compatable with high-temperature fuel cell use.

SUMMARY OF THE INVENTION

In accordance with the present invention, there is provided a process for removing sulfur containing gases from a gaseous fuel mixture. The fuel mixture is contacted with a sorbent including a minor proportion of copper as elemental copper or as a copper oxide supported in mixture on a major proportion of zinc oxide.

In more specific aspects of the invention, copper oxide is highly dispersed on the zinc oxide support and is reduced in a preliminary step to copper metal or a lower oxide of copper for contact with the gaseous fuel mixture. The reduction is performed at temperatures of about 250°–650° C.

In other aspects a substantially continuous flow of gaseous fuel mixture containing hydrogen sulfide is contacted with the sorbent to form sulfides of copper in a highly dispersed state throughout the sorbent mixture. By monitoring the hydrogen sulfide for a predetermined breakthrough concentration in the gaseous fuel leaving the sorbent, it is determined when to provide fresh or regenerated sorbent.

DETAILED DESCRIPTION OF THE PREFERRED EMBODIMENT

In performing the method of the present invention, fuel gas is treated by contact with a solid particulate sorbent including copper and zinc oxide. The copper is provided in minor proportion in respect to the zinc but in sufficient amount to act as the principle agent for sorbing sulfur containing gases from the fuel gas. The copper is preferably present in about 3–4 atomic portions in respect to the total copper and zinc in the mixture. Correspondingly, the zinc is present at about 7–6 atomic portions of the total. In a mixture of CuO and ZnO, this corresponds to about 30–40% CuO and 60–70% by weight ZnO.

One convenient source of the sorbent mixture is that of commercially available catalyst used for water gas shift reactions in the production of gaseous fuels or feedstocks with increased hydrogen concentrations. Such catalysts are poisoned by only trace quantities of sulfur. Accordingly, their use as catalyst was restricted to gas streams from which the sulfur content has been removed or greatly reduced through scrubbing or other known sulfur removal techniques.

A particularly useful, commerically available catalyst is a water gas shift catalyst which contains by weight about ⅓ CuO and ⅔ ZnO. The catalyst is available in small pellets or particles of high porosity and specific surface area to enhance contact with reactants. Advantageously, the cupric oxide is highly dispersed throughout the zinc oxide as small crystals or crystallites of no more than a few microns maximum dimensions. Preferably, the copper remains dispersed throughout use and does not agglomerate or otherwise form regions of more than 100 microns maximum dimensions.

Although the CuO-ZnO porous material may be employed as the sorbent without special treatment, it is of advantage to chemically reduce the CuO to elemental copper or lower oxides of copper. Accordingly, the sorbent mixture used in the method of the present invention will preferably include elemental copper but may also contain copper oxides and lower oxides of copper in mixture with a support of porous zinc oxide.

It has been found that the reduction of oxides of copper in a mixture with zinc oxide can be effectively performed by contact with hydrogen gas at temperatures of 230°–650° C. However, as a matter of economics and convenience the reduction is preferably performed at temperatures of 230°–250° C.

In removing sulfur containing gases from the fuel gas mixture, the gas is contacted with the copper-zinc oxide sorbent in a suitable manner to permit exposure and reaction of the sulfur gases with the sorbent constituents. Advantageously, elemental copper, oxides of copper, and zinc oxide are present for removing hydrogen sulfide and other sulfur containing gases from the fuel gas mixture. In one manner of performing the method, the sorbent is present in particulate porous form as a fixed bed for receiving the flow of fuel gas. After the sorbent mixture becomes spent with such high levels of sulfur that a predetermined breakthrough concentration of hydrogen sulfide or other sulfur gas is discharged, the flow is diverted by suitable means to enter a new or regenerated fixed bed of sorbent material.

It also will be clear that the sorbent material of the present method may be employed in a fluidized bed through which the fuel gas flows and provides fluidization. In this variation, spent material can be withdrawn and fresh or regenerated solid sorbent material added as required to maintain the clean fuel gas at below a predetermined breakthrough sulfur concentration.

The predetermined breakthrough concentration is the maximum acceptable sulfur concentration of the product gas. For molten carbonate fuel cell use the feed gas should be below about 1 ppm by volume hydrogen sulfide. Economical operation of a fuel gas clean-up system can involve a system with two or more beds. One bed can remove the bulk of the sulfur containing gases and operate at a breakthrough level of 10-20 ppmV hydrogen sulfide. A second bed then removes the final traces to a level below about 1 ppmV. When the first bed becomes spent, it can be removed for regeneration or disposal. The second bed material may be switched to become the first bed and fresh or regenerated sorbent placed for final clean-up. For this reason, levels of 10-20 ppmV are selected as the predetermined breakthrough level to define the bed lifetime. In other applications a different predetermined breakthrough level may be selected based on a different acceptable level of sulfur containing gas.

The sorbent of the present method is effective at removing sulfur containing gases particularly hydrogen sulfide at temperatures as high as 500°-700° C. Although it is expected that the sorbent will take up hydrogen sulfide at temperatures lower than these values it is of considerable advantage and importance that the sorbent can be employed at these elevated temperatures. Consequently, fuel gases produced in high temperature gasifiers for coal, shale or various other carbonaceous materials can be directly processed for sulfur removal and presented as fuel supply gases for high temperature fuel cells. Applicants sorbent method allows such producer gases to be employed in these high-temperature fuel cells without the inefficiencies involved in cooling and reheating the gas prior to use.

Moreover, the copper-zinc oxide sorbent provides a substantial sulfur loading capacity and can maintain such capacities even when operated at large space velocities ranging from 700-2500 hr$^{-1}$ (standard volumes of gas/volume of sorbent/hr). In contrast to the previous use of zinc oxide alone, copper oxide alone, and copper oxide supported on traditional support surfaces, the use of the present sorbent unexpectedly permits sulfur loadings of typically 3% by weight of the sorbent.

It has also been found that a spent mixture of copper oxide and zinc oxide sorbent can be regenerated to remove substantially all, that is more than about 90% by weight of the sulfur content. The regeneration of the sorbent can be performed by a number of techniques. In one regeneration method the spent sorbent is oxidized in air and decomposed to give off sulfur dioxide gas. More advantageously, the sorbent is regenerated by desorption and oxidation with a steam air mixture in a single step. This steam-air regeneration is more fully described in the assignee's copending U.S. application entitled "Desulfurization Sorbent Regeneration" by Jalan and Frost, U.S. patent application Ser. No. 395,894, filed July 7, 1982. As with the fresh solvent, it is of substantial advantage to complete the regeneration process by chemical reduction of the oxides of copper prior to reuse. The reduction for instance with hydrogen gas, not only reduces copper oxides to elemental copper and lower oxides of copper, but also removes portions of residual sulfur from the otherwise regenerated sorbent. Regeneration with a steam-air mixture has been found to eliminate any need for the decomposition step following air oxidation.

The present invention is illustrated in the following examples.

COMPARATIVE EXAMPLE I

A particulate sorbent from pelletized reagent grade, copper oxide (unsupported) was contacted with a flow of a simulated coal gas containing 200 ppm by volume $H_2S$. The gas flow at an hourly space velocity in respect to the catalyst of about 1900 hr$^{-1}$ and a temperature of 650° C. was desulfurized to below 10 ppm $H_2S$ for a period of about 7 hrs when exit concentrations above 10 ppm breakthrough occurred. Following regeneration by air oxidation at about 650°-700° C., decomposition in nitrogen at 700°-800° C., and hydrogen reduction at about 650° C., the sorbent was reused in similar operations. Table I below gives additional results of the unsupported copper oxide. The second and third lines of data correspond to use of regenerated material.

TABLE I

| Comp. Wt. % | Desulf. Temp. °C. | Time to Breakthrough Hrs. | Sulfur Loading Wt. % |
|---|---|---|---|
| 100 CuO | 650 | 7.25 | 0.19 |
| | 650 | 6.0 | 0.13 |
| | 650 | 5.5 | 0.13 |

COMPARATIVE EXAMPLE II

About 30% copper oxide supported on silica, United Catalyst G108B, was contacted with a simulated fuel gas containing about 220 ppm hydrogen sulfide under about the same conditions as in Example 1. Desulfurization initially occurred at 500° C. In subsequent operations with regenerated sorbent, desulfurization temperatures as high as 600° C. were used. Regeneration was performed by air oxidation at 500°-600° C. followed by hydrogen reduction also at 500°-600° C. Table II below presents typical results obtained with the regenerated copper supported on silica. A 12 ppm by volume breakthrough value was selected. The substantially increased performance in sulfur loading illustrated by the last item of data is attributed to the lower desulfurization temperature combined with modified regeneration conditions within the above range of conditions.

TABLE II

| Comp. Wt. % | Desulf. Temp. °C. | Time to Breakthrough Hrs. | Sulfur Loading Wt. % |
|---|---|---|---|
| 30 Cu | 500 | 8.75 | 0.23 |
| 70 SiO$_2$ | 500 | 11.0 | 0.28 |
| | 550 | 1.0 | 0.026 |
| | 550 | 1.5 | 0.040 |
| | 550 | 1.25 | 0.032 |
| | 600 | 1.0 | 0.026 |
| | 550 | 2.0 | 0.053 |
| | 550 | 2.25 | 0.059 |
| | 500 | 60.75 | 1.59 |

EXAMPLE III

A simulated fuel gas containing about 200 ppm hydrogen sulfide by volume was passed through a bed of sorbent pellets including finely dispersed copper oxide on zinc oxide support. The sorbent bed was provided from a commercially available water gas shift catalyst containing by weight about 33% CuO and 67% ZnO (United Catalyst G66B). The sorbent material was contacted with the fuel gas flow as in Comparitive Example I and II until a breakthrough concentration of about 10 ppm hydrogen sulfide appeared. The spent material was regenerated by air oxidation at about 650°-750° C. followed by decomposition of sulfates in nitrogen at about 750° C. Results given below in Table IIIa show a sulfur loading at least as great as that obtained in the best runs with the silica supported copper.

TABLE IIIa

| Comp. Wt. % | Desulf. Temp. °C. | Time to Breakthrough Hrs. | Sulfur Loading Wt. % |
|---|---|---|---|
| 33 CuO | 650 | 3.25 | 1.56 |
| 67 ZnO | 650 | 3.0 | 1.42 |
|  | 650 | 3.5 | 1.50 |

Additional runs with the same but regenerated sorbent material were conducted with the addition of a hydrogen reduction step to provide a highly dispersed elemental copper sorbent throughout the zinc oxide. The hydrogen reduction was carried out at temperatures of 230°-250° C. at space velocities of hydrogen gas flow of about 3600 hr$^{-1}$ in respect to the sorbent. The regenerated sorbent was contacted with the simulated fuel gas at temperatures of 650° C. to obtain substantially increased loadings of 2 to above 3 weight percent. Breakthrough times up to which the fuel gas was cleaned to below 10 ppm hydrogen sulfide were found to be consistently above 10 hrs. An additional improvement was incorporated in the last five runs by regenerating the sorbent material by contact with a steam-air mixture containing approximately 4% oxygen by volume at about 750° C. followed by hydrogen reduction. The decomposition step in nitrogen was effectively eliminated through use of the steam-air desorption and oxidation. Table IIIb below presents additional data respecting the use of the regenerated copper on zinc oxide sorbent.

TABLE IIIb

| Comp. Wt. % | Desulf. Temp. °C. | Time to Breakthrough Hrs. | Sulfur Loading Wt. % |
|---|---|---|---|
| 33 CuO | 650 | 10.05 | 2.57 |
| 67 ZnO | 650 | 11.45 | 2.86 |
|  | 650 | 14.35 | 3.54* |
|  | 650 | 12.25 | 2.98* |
|  | 650 | 13.56 | 3.28* |
|  | 650 | 13.05 | 3.21* |

TABLE IIIb-continued

| Comp. Wt. % | Desulf. Temp. °C. | Time to Breakthrough Hrs. | Sulfur Loading Wt. % |
|---|---|---|---|
|  | 650 | 12.0 | 2.92* |

*Regeneration by contact with steam-air mixture followed by hydrogen reduction.

It is therefore seen that an improved method for removing hydrogen sulfide and other sulfur containing gases is presented. The process can be conducted at elevated temperatures to obviate any need for cooling the gas prior to its use in high temperature applications such as high-temperature fuel cells. A new use is presented for a water gas shift catalyst that has not previously been known or suggested. This catalyst material can be used effectively to remove substantial concentrations of hydrogen sulfide from carbonaceous gases and can be regenerated for repetitive use.

The present invention is described in terms of particular materials and process conditions but it will be clear to one skilled in the art that various changes and modifications can be made within the scope of the invention as defined in the following claims.

The embodiments of this invention in which an exclusive property or privilege is claimed are defined as follows:

1. A method of removing hydrogen sulfide from a gaseous mixture at a temperature of 500°-700° C. comprising:
    providing a sorbent mixture including about 60-70% ZnO and 30-40% by weight highly dispersed CuO;
    reducing the CuO to elemental copper by contact with hydrogen gas at a temperature of 230°-650° C.;
    passing the gaseous mixture at a temperature of 500°-700° C. into contact with the reduced sorbent mixture to form sulfides of copper in the sorbent as it is spent;
    regenerating the spent sorbent in an oxidizing atmosphere to remove substantially all of its sulfur content and form a regenerated sorbent mixture including a major proportion of ZnO and a minor proportion of CuO;
    reducing the regenerated CuO to elemental copper and passing additional gaseous mixture into contact with the reduced and regenerated sorbent mixture for removing H$_2$S from the gaseous mixture.

2. The method of claim 1 wherein the gaseous mixture contacts the sorbent in a continuous flow at a space velocity of about 700-2500 hr$^{-1}$ in respect to the volume of the sorbent.

3. The method of claim 1 wherein a substantially continuous flow of gaseous mixture passes in contact with the sorbent while monitoring the H$_2$S concentration in the said mixture leaving contact with the sorbent and wherein sorbent substantially free of sulfides of copper is provided for contacting said continuous flow of gaseous mixture when said concentration of H$_2$S exceeds a predetermined breakthrough level.

* * * * *